(12) United States Patent
Ju

(10) Patent No.: US 12,381,471 B2
(45) Date of Patent: Aug. 5, 2025

(54) SYSTEMS, METHODS, APPARATUSES, AND INTEGRATED CIRCUITS FOR POWER CONVERSION WITH IMPROVED REGULATOR CONTROL

(71) Applicant: Murata Manufacturing Co., Ltd., Kyoto (JP)

(72) Inventor: Jeffrey Ju, Boston, MA (US)

(73) Assignee: Murata Manufacturing Co., Ltd., Kyoto (JP)

( * ) Notice: Subject to any disclaimer, the term of this patent is extended or adjusted under 35 U.S.C. 154(b) by 180 days.

(21) Appl. No.: 17/938,396

(22) Filed: Oct. 6, 2022

(65) Prior Publication Data

US 2024/0120824 A1    Apr. 11, 2024

(51) Int. Cl.
*G05F 1/56* (2006.01)
*H02M 1/00* (2006.01)
*H02M 3/07* (2006.01)

(52) U.S. Cl.
CPC ............ *H02M 1/0045* (2021.05); *G05F 1/56* (2013.01); *H02M 3/07* (2013.01)

(58) Field of Classification Search
CPC .......... H02M 1/0045; H02M 3/07; G05F 1/56
See application file for complete search history.

(56) References Cited

U.S. PATENT DOCUMENTS

| | | | | |
|---|---|---|---|---|
| 2003/0067289 | A1* | 4/2003 | Morita | G09G 3/3611 323/282 |
| 2009/0273957 | A1* | 11/2009 | Feldtkeller | H02M 1/38 363/98 |
| 2010/0148580 | A1* | 6/2010 | Taniuchi | H02J 1/102 307/29 |
| 2020/0333873 | A1* | 10/2020 | El Sherif | G06F 1/3296 |
| 2022/0200447 | A1* | 6/2022 | Khlat | H03F 3/24 |

* cited by examiner

*Primary Examiner* — Harry R Behm
(74) *Attorney, Agent, or Firm* — Haynes and Boone, LLP

(57) ABSTRACT

The present disclosure relates to power conversion, and more particularly, to systems, methods, apparatuses, and integrated circuits for power conversion with improved regulator control. In one embodiment, a power converter system is disclosed, comprising: a power conversion circuit; a linear regulator; a first switching device electrically coupled between an output of the power conversion circuit and an output of the linear regulator; and a control circuitry electrically coupled to the first switching device. In this power conversion circuit, after a voltage at the output of the power conversion circuit exceeds a reference voltage, the control circuitry is configured to discharge an output capacitance of the linear regulator until a voltage at the output of the linear regulator is substantially the same as the voltage at the output of the power conversion circuit.

26 Claims, 5 Drawing Sheets

SYSTEMS, METHODS, APPARATUSES, AND INTEGRATED CIRCUITS FOR POWER CONVERSION WITH IMPROVED REGULATOR CONTROL

TECHNICAL FIELD

The present disclosure relates to power conversion, and more particularly, to systems, methods, apparatuses, and integrated circuits for power conversion with improved regulator control.

BACKGROUND

Many electronic products, particularly mobile computing and/or communication products and components (e.g., notebook computers, ultra-book computers, tablet devices, LCD and LED displays), require multiple voltage levels. For example, power amplifiers for radio frequency transmitters may require relatively high voltages (e.g., 12 volts (V) or more), and logic circuitry may require a low voltage level (e.g., 1-2 V). Some other circuitry may require an intermediate voltage level (e.g., 5-10 V). Power converters are often used to generate a lower or higher voltage from a common power source, such as a battery, in order to meet the power requirements of different components in electronic products.

SUMMARY

Embodiments of the present disclosure may provide systems, methods, apparatuses, and integrated circuits for power conversion with improved regulator control.

In one embodiment, a power converter system is disclosed, comprising: a power conversion circuit; a linear regulator; a first switching device electrically coupled between an output of the power conversion circuit and an output of the linear regulator; and a control circuitry electrically coupled to the first switching device. In this power conversion circuit, after a voltage at the output of the power conversion circuit exceeds a reference voltage, the control circuitry is configured to discharge an output capacitance of the linear regulator until a voltage at the output of the linear regulator is substantially the same as the voltage at the output of the power conversion circuit.

In another embodiment, a power conversion method is disclosed. The method comprises comparing, via a control circuitry, a voltage at an output of a power conversion circuit to a reference voltage. A first switching device is electrically coupled between the output of the power conversion circuit and an output of a linear regulator. The control circuitry is electrically coupled to the first switching device. The method further comprises discharging an output capacitance of the linear regular after the voltage at the output of the power conversion circuit exceeds the reference voltage, until a voltage at the output of the linear regulator is substantially the same as the voltage at the output of the power conversion circuit.

In yet another embodiment, an integrated circuit is disclosed. The integrated circuit comprises a first switching device; and a control circuitry electrically coupled to the first switching device. The first switching device is configured to be electrically coupled between an output of a power conversion circuit and an output of a linear regulator. After a voltage at the output of the power conversion circuit exceeds a reference voltage, the control circuitry is configured to discharge an output capacitance of the linear regulator until a voltage at the output of the linear regulator is substantially the same as the voltage at the output of the power conversion circuit.

It is to be understood that the foregoing general description and the following detailed description are exemplary and explanatory only, and are not restrictive of the invention, as claimed.

DETAILED DESCRIPTION

Figure 1:
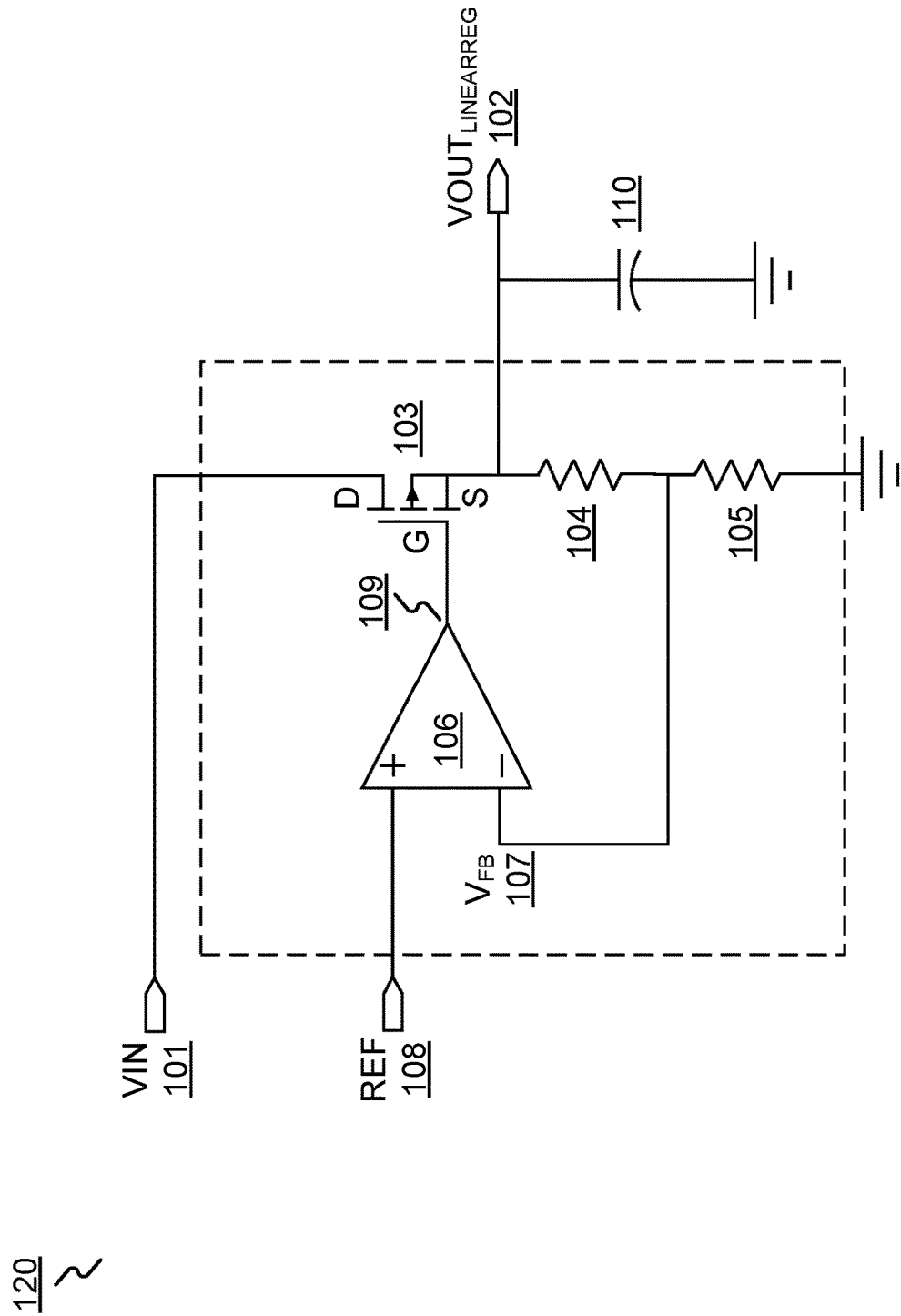
FIG. 1 is a circuit diagram of an example linear regulator.

The following disclosure provides different exemplary embodiments, or examples, for implementing different features of the provided subject matter. Specific simplified examples of components and arrangements are described below to explain the present disclosure. These embodiments are examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. While embodiments of the present disclosure may address certain challenges and provide certain benefits, the stated problems and features are intended to be examples only and not to limit the claims or scope of this disclosure. Indeed, the disclosed embodiments may address other challenges and provide other benefits not explicitly enumerated below.

Linear regulators may be used as components for power supply chips for internal supplies. The inventors here have recognized problems that may be associated with certain linear regulators. FIG. 1 shows an example circuit diagram of a linear regulator 120. Linear regulator 120 may be used to provide a steady output voltage $VOUT_{LINEARREG}$ 102 given a fluctuating input voltage VIN 101. Linear regulator 120 may employ a field effect transistor 103 that operates in its linear (saturation/active) mode, thus behaving as a variable resistor. In some embodiments, field effect transistor 103 may be a metal-oxide-semiconductor field effect transistor (MOSFET). Linear regulator 120 may regulate output voltage $VOUT_{LINEARREG}$ 102 by placing the variable resistance of the field effect transistor 103 in series with an output load (not shown, connected to output voltage $VOUT_{LINEARREG}$ 102), and controlling the variable resistance to regulate the output voltage $VOUT_{LINEARREG}$ 102 across the output load. For example, the greater the variable resistance, the lower the output voltage $VOUT_{LINEARREG}$ 102 across the output load, and lower the variable resistance, the greater the output voltage $VOUT_{LINEARREG}$ 102 across the output load. In some embodiments, input voltage VIN 101 of linear regulator 120 may be coupled to a drain D of a p-channel enhancement MOSFET 103 (as shown in FIG. 1), and a source S of the p-channel enhancement MOSFET 103 (as shown in FIG. 1) may provide output voltage VOUT$_{LINEARREG}$ 102 and be coupled to the output load. It is to be understood that both n-channel and p-channel MOSFETs, of both enhancement and depletion type, may be used within embodiments of this disclosure. Persons of ordinary skill in the art would understand how to arrange and couple the source, drain, and gate terminals of such MOSFETs to the other components of linear regulator 120 to implement a controllable variable resistance to regulate the voltage across the output load.

To control the variable resistance of the field effect transistor 103 through a feedback loop, linear regulator 120 may include an output voltage sampling resistor network comprising a resistor 104 and a resistor 105, as well as a two-input buffer 106. The output voltage sampling resistor network may provide a feedback voltage $V_{FB}$ 107 that is connected to one terminal (e.g., the negative terminal) of the two-input buffer 106. The other terminal (e.g., the positive terminal) of the two-input buffer 106 may be coupled with a reference voltage input REF 108. An output 109 of the buffer 106 may drive (e.g., through a current amplifier, not shown) the gate G of the field effect transistor 103 to control its variable resistance. Linear regulator 120 may also include an output capacitance 110 to reduce ripples in output voltage VOUT$_{LINEARREG}$ 102.

Linear regulators provide several advantages. For example, they have a simple design, resulting in low manufacturing costs. They use components that can be manufactured in integrated circuit form. The resulting integrated circuit package requires few pins and can have a small form factor. Also, unlike switching regulators, linear regulators do not suffer from excess noise in their output voltage due to high frequency switching of the switches included in the switching regulators.

A drawback of the linear regulator 120 is that the voltage drop across the resistance of the field effect transistor 103 results in thermal power dissipation of the field effect transistor 103, which may result in lowered efficiency compared to switching regulators. The efficiency of linear regulator 120 may be described by the following equation:

$$\text{Efficiency} = \frac{IOUT_{LINEARREG} * VOUT_{LINEARREG}}{(IOUT_{LINEARREG} + I_Q) * VIN} * 100$$

Here, IOUT$_{LINEARREG}$ is the linear regulator's output current, VOUT$_{LINEARREG}$ is linear regulator's output voltage VOUT$_{LINEARREG}$ 102, $I_Q$ is a quiescent current associated with the field effect transistor 103, and VIN is input voltage VIN 101. The difference between input voltage VIN 101 and output voltage VOUT$_{LINEARREG}$ 102, if reduced, may increase the efficiency of the linear regulator 120. A linear regulator that operates with relatively low headroom (VIN 101-VOUT$_{LINEARREG}$ 102) is commonly referred to by persons of ordinary skill in the art as a low dropout regulator (LDO).

Figure 2:
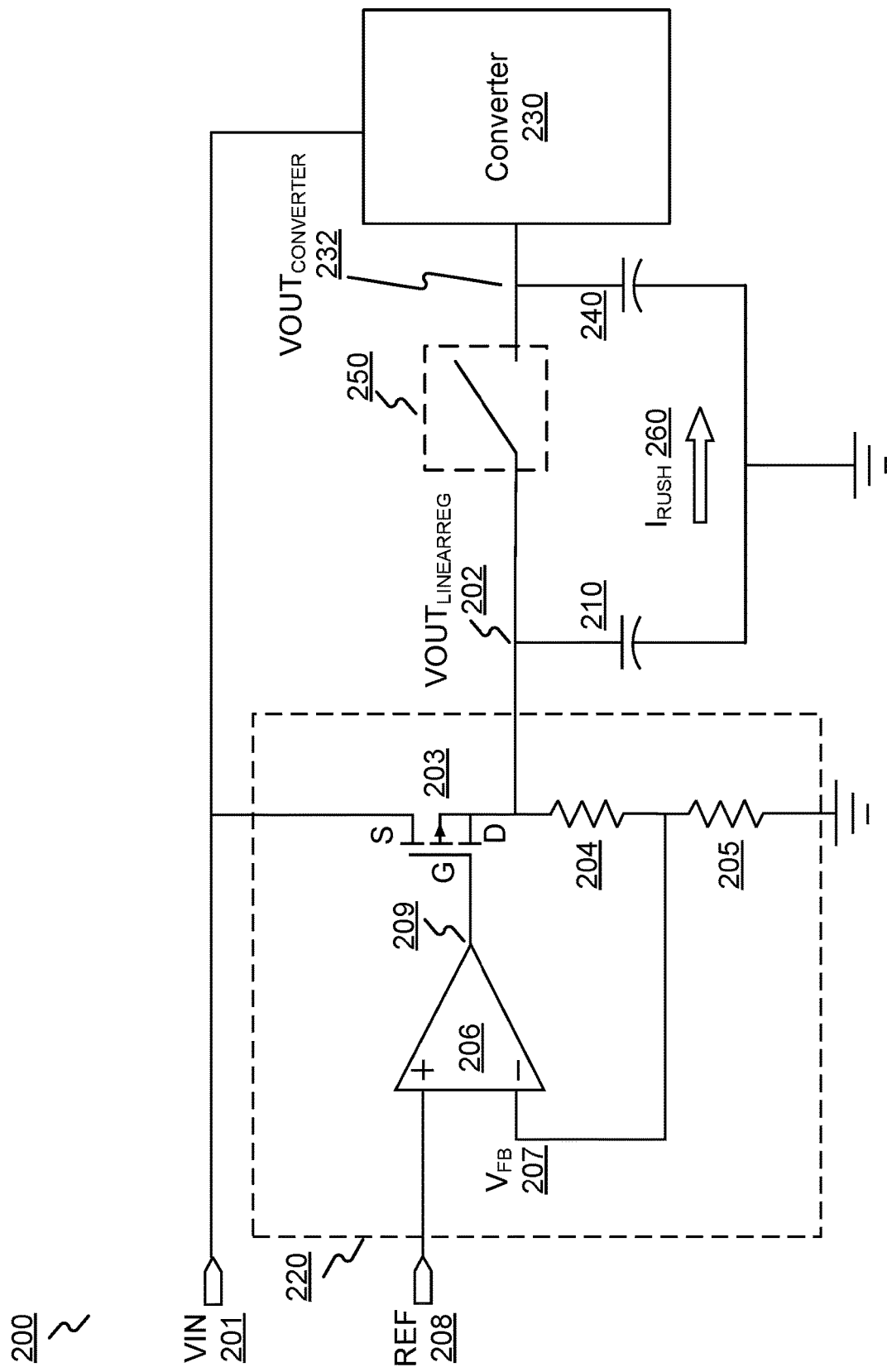
FIG. 2 is a circuit diagram of an example linear regulator with back-biasing using a power conversion circuit.

Back-biasing of the linear regulator 120 can be used to control the threshold voltage of the field effect transistor 103 and thus enable low drop out regulation by the linear regulator 120. FIG. 2 shows an example circuit 200 for back-biasing a linear regulator. Circuit 200 may include a linear regulator 220 similar to linear regulator 120 of FIG. 1. Linear regulator 220 may be used to provide a steady output voltage VOUT$_{LINEARREG}$ 202 given a fluctuating input voltage VIN 201. Linear regulator 220 may employ a field effect transistor 203 that operates in its linear (saturation/active) mode, thus behaving as a variable resistor. In some embodiments, field effect transistor 203 may be a metal-oxide-semiconductor field effect transistor (MOSFET). Linear regulator 220 may regulate output voltage VOUT$_{LINEARREG}$ 202 by placing the variable resistance of the field effect transistor 203 in series with an output load (not shown, connected to output voltage VOUT$_{LINEARREG}$ 202), and controlling the variable resistance to regulate the output voltage VOUT$_{LINEARREG}$ 202 across the output load. For example, the greater the variable resistance, the lower the output voltage VOUT$_{LINEARREG}$ 202 across the output load, and lower the variable resistance, the greater the output voltage VOUT$_{LINEARREG}$ 202 across the output load. In some embodiments, input voltage VIN 201 of linear regulator 220 may be coupled to a drain D of a p-channel enhancement MOSFET 203 (as shown in FIG. 2), and a source S of the p-channel enhancement MOSFET 203 (as shown in FIG. 2) may provide output voltage VOUT$_{LINEARREG}$ 202 and be coupled to the output load. It is to be understood that both n-channel and p-channel MOSFETs, of both enhancement and depletion type, may be used within embodiments of this disclosure. Persons of ordinary skill in the art would understand how to arrange and couple the source, drain, and gate terminals of such MOSFETs to the other components of linear regulator 220 to implement a controllable variable resistance to regulate the voltage across the output load.

To control the variable resistance of the field effect transistor 203 through a feedback loop, linear regulator 220 may include an output voltage sampling resistor network comprising a resistor 204 and a resistor 205, as well as a two-input buffer 206. The output voltage sampling resistor network may provide a feedback voltage VFs 207 that is connected to one terminal (e.g., the negative terminal) of the two-input buffer 206. The other terminal (e.g., the positive terminal) of the two-input buffer 206 may be coupled with a reference voltage input REF 208. An output 209 of the buffer 206 may drive (e.g., through a current amplifier, not shown) the gate G of the field effect transistor 203 to control its variable resistance. Linear regulator 220 may also include an output capacitance 210 to reduce ripples in output voltage VOUT$_{LINEARREG}$ 202.

For example, power conversion circuit 230 may be a switched-capacitor circuit, such as a charge pump circuit. In some embodiments, power conversion circuit 230 may accept the same input voltage VIN 201 as linear regulator 220. Power conversion circuit 230 may provide an output terminal, and power conversion circuit 230 may output a voltage VOUT$_{CONVERTER}$ 232 via the output terminal. Power conversion circuit 230 may also include an output capacitance 240 to reduce ripples in its output voltage VOUT$_{CONVERTER}$ 232.

In some embodiments, circuit 200 may include a first switching device 250 coupled between the output of linear regulator 220 (e.g., the source S of the p-channel enhancement MOSFET 203 (as shown in FIG. 2)) and the output of power conversion circuit 230. The first switching device 250 may be configured to open or close in response to a control signal provided to the first switching device 250 (controller and control signal not shown in FIG. 2). When the first switching device 250 is closed, the output voltage VOUT$_{CONVERTER}$ 232 of power conversion circuit 230 may be applied as a back-biasing voltage to the output of linear regulator 220 (e.g., applied to the source S of the p-channel enhancement MOSFET 203 (as shown in FIG. 2)).

Figure 3:
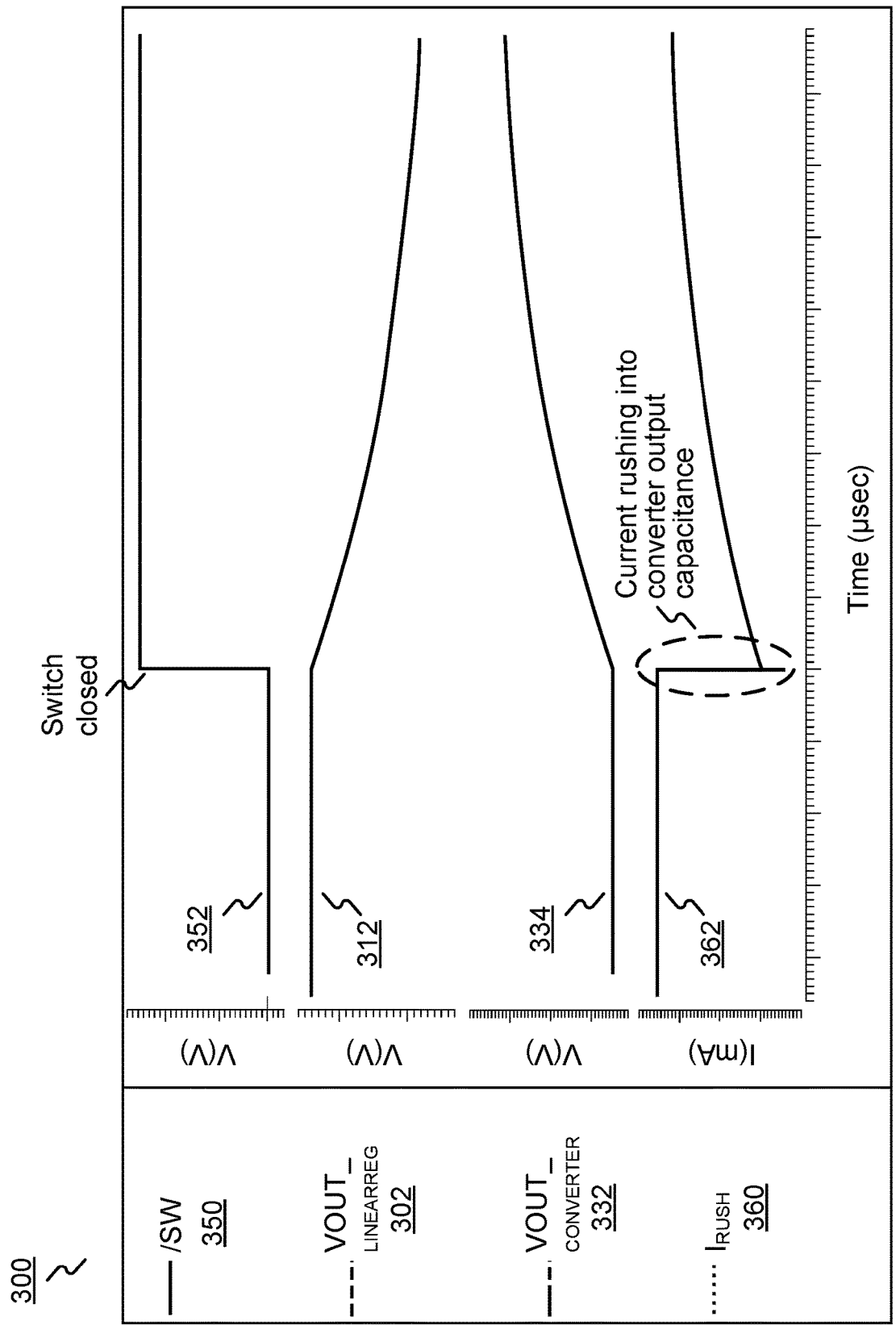
FIG. 3 is an example timing diagram illustrating traces of various signals that may be present in the example linear regulator with back-biasing using a power conversion circuit of FIG. 2.

A potential drawback of the back-biasing scheme in circuit 200 of FIG. 2 is that when the first switching device 250 is closed, an undesired instantaneous spike in in-rush current 260 may be caused by the voltage difference between $VOUT_{LINEARREG}$ 202 and $VOUT_{CONVERTER}$ 232. FIG. 3 provides an example timing diagram 300 illustrating such an instantaneous spike of in-rush current 260. For example, the first switching device 250 of FIG. 2 may be configured to open or close in response to a control signal/SW 350 of FIG. 3 provided to the first switching device 250. Signal trace 352 for control signal/SW 350 depicts when the control signal/SW 350 transitions from open to closed status, as shown in FIG. 3. For example, in response to the control signal/SW 350 transitioning from open to closed status, the signal trace 312 for $VOUT_{LINEARREG}$ 202 and the signal trace 334 for $VOUT_{CONVERTER}$ 232 show that the output voltage $VOUT_{LINEARREG}$ 202 of linear regulator 220 and the output voltage $VOUT_{CONVERTER}$ 232 of power conversion circuit 230 converge. For example, the output voltage $VOUT_{LINEARREG}$ 202 of linear regulator 220 may be lowered to match the output voltage $VOUT_{CONVERTER}$ 232 of power conversion circuit 230 by charge transfer between output capacitance 210 of linear regulator 220 and output capacitance 240 of power conversion circuit 230, causing an in-rush current $I_{RUSH}$ 260/360. Further, for example, signal trace 362 for in-rush current $I_{RUSH}$ 360 shows that, in response to the control signal/SW 350 transitioning from open to closed status, the in-rush current $I_{RUSH}$ 260/360 (e.g., caused by transfer of charge between output capacitance 210 of linear regulator 220 and output capacitance 240 of power conversion circuit 230) has an instantaneous spike in response to the closing of the first switching device 250 of FIG. 2.

The inventors here have recognized that reducing or minimizing in-rush current is desirable because a high in-rush current reduces the source voltage, which results in the amount of current supplied may exceed the maximum rating of the load. Further, the inventors have recognized that reducing or minimizing in-rush current is desirable because it may disturb the system output at a very light load.

Figure 4:
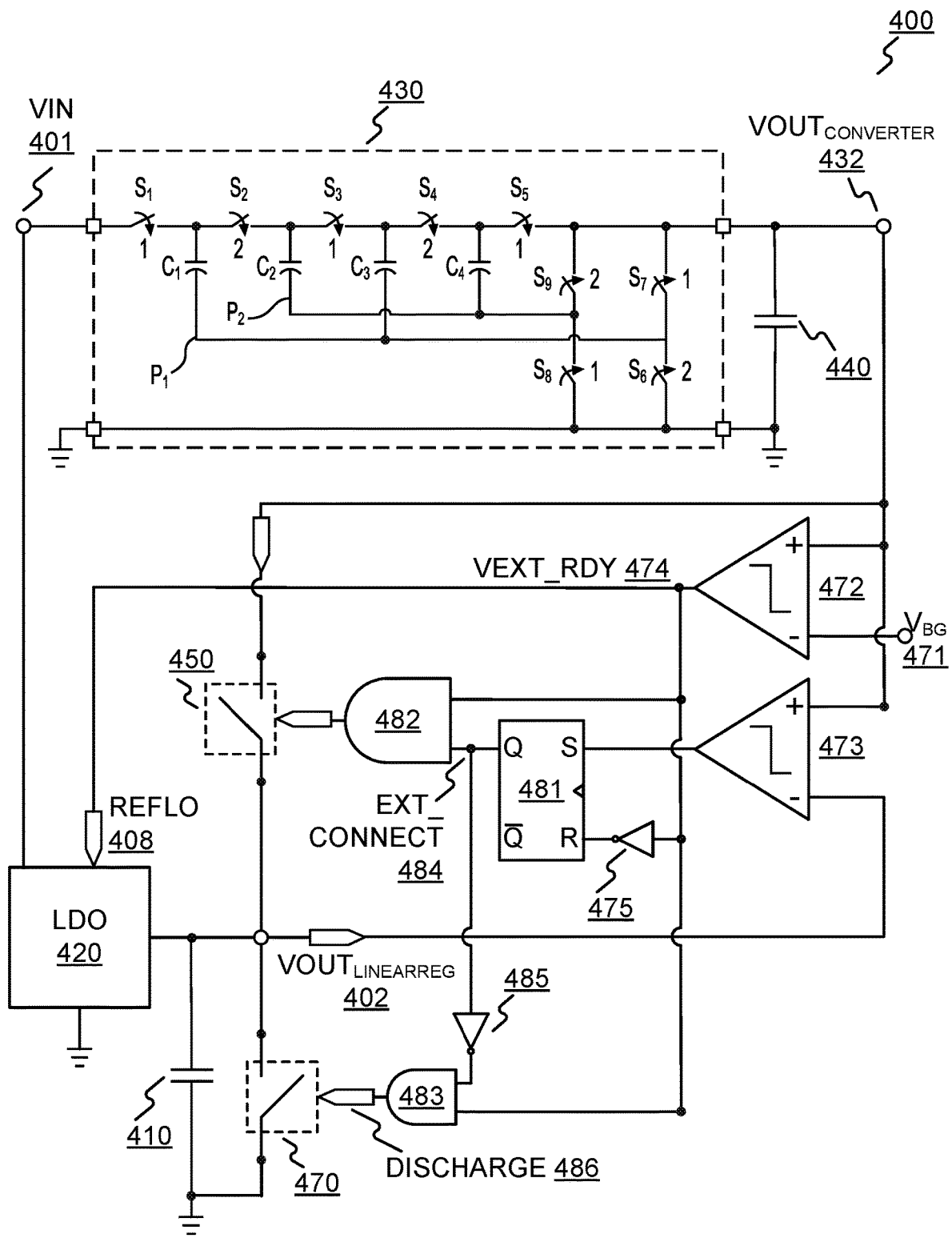
FIG. 4 is a circuit diagram of an example linear regulator with back-biasing using a power conversion circuit and associated control circuitry.

In some embodiments, such undesirable instantaneous spikes of in-rush current may be reduced or minimized by bringing the output voltage $VOUT_{LINEARREG}$ 202 of linear regulator 220 down to a value that is substantially similar to the back-biasing voltage, i.e., the output voltage $VOUT_{CONVERTER}$ 232 of power conversion circuit 230, before closing the first switching device 250. FIG. 4 depicts an example circuit 400 to accomplish such an advantageous operation. Circuit 400 may include a linear regulator 420 similar to linear regulator 120 of FIG. 1 or the linear regulator 220 of FIG. 2. The discussions of linear regulator 120 of FIG. 1 and the linear regulator 220 of FIG. 2 are incorporated herein by reference. In some embodiments, linear regulator 420 may be a low drop-out regulator. Linear regulator 420 may be used to provide a steady output voltage $VOUT_{LINEARREG}$ 402 given a fluctuating input voltage VIN 401. Linear regulator 420 may also include an output capacitance 410 to reduce ripples in output voltage $VOUT_{LINEARREG}$ 402.

In addition, circuit 400 may include a power conversion circuit 430 to provide back-biasing of the linear regulator 420, to modulate the gate voltage of a field effect transistor in linear regulator 420. For example, power conversion circuit 430 may be a step-down converter. As a further example, power conversion circuit 430 may be a switched-capacitor circuit, such as a charge pump circuit. As a further example, power conversion circuit 430 may be a switched-capacitor circuit, such as a charge pump circuit, that is configured to operate as a step-down converter.

For example, power converter circuit 430 may be a charge pump circuit that includes capacitors $C_1$, $C_2$, $C_3$, and $C_4$; switches $S_1$, $S_2$, $S_3$, $S_4$, $S_5$, $S_6$, $S_7$, $S_8$, and $S_9$; and an output capacitor 440. Power conversion circuit 430 may accept an input voltage VIN 401 and produce an output voltage $VOUT_{CONVERTER}$ 432 with output current $IOUT_{CONVERTER}$. In some embodiments, power conversion circuit 430 may accept the same input voltage VIN 401 as linear regulator 420. Power conversion circuit 430 may provide an output terminal, and power conversion circuit 430 may output a voltage $VOUT_{CONVERTER}$ 432 via the output terminal. As an example, power converter circuit 430 may be operated by controlling sets of switches that may cause charge to pass between the capacitors and between their terminals and the capacitors. The control of the switches of power converter circuit 430 can be represented as a cycle through a series of states, where each state may be associated with a particular configuration of the set of switches (e.g., open-circuit (non-conducting) and closed-circuit (conducting) configuration of the switches). Power conversion circuit 430 may also include an output capacitance 440 to reduce ripples in its output voltage $VOUT_{CONVERTER}$ 432.

Further, circuit 400 may include a first switching device 450 coupled between the output of linear regulator 420 (e.g., the source S of a p-channel enhancement MOSFET used in linear regulator 420, like those shown in FIG. 1 and FIG. 2) and the output of power conversion circuit 430. The first switching device 450 may be configured to open or close in response to a control signal provided to the first switching device 450 (see, e.g., output of AND gate 482 in in FIG. 4). When the first switching device 450 is closed, the output voltage $VOUT_{CONVERTER}$ 432 of power conversion circuit 430 may be applied as a back-biasing voltage to the output of linear regulator 420 (e.g., applied to the drain D of the p-channel enhancement MOSFET 203, like that shown in FIG. 2). In some embodiments, switching from the output of linear regulator 420 to the output voltage $VOUT_{CONVERTER}$ 432 of power conversion circuit 430 may be advantageous in that it is more efficient to switch voltage supply from linear regulator 420 to output voltage $VOUT_{CONVERTER}$ 432 to power the internal circuitry of circuit 400 during ramp up of power conversion circuit 430.

Next are described systems and methods to reduce or minimize undesired instantaneous spike of in-rush current caused by voltage difference between $VOUT_{LINEARREG}$ 402 and $VOUT_{CONVERTER}$ 432 when the first switching device 450 is closed to apply the output voltage $VOUT_{CONVERTER}$ 432 of power conversion circuit 430 as back-biasing voltage to the output of linear regulator 420. For example, such undesirable instantaneous spike of in-rush current may be reduced or minimized by bringing the output voltage $VOUT_{LINEARREG}$ 402 of linear regulator 420 down to a value that is substantially similar to the back-biasing voltage, i.e., the output voltage $VOUT_{CONVERTER}$ 432 of power conversion circuit 430, before closing the first switching device 450. In this manner, the charge transfer between output capacitance 210 of linear regulator 220 and output capacitance 240 of power conversion circuit 230 upon closing of the first switching device 450 can be reduced or minimized.

In some embodiments, the output voltage $VOUT_{LINEARREG}$ 402 of linear regulator 420 may be considered substantially the same as the output voltage $VOUT_{CONVERTER}$ 432 of power conversion circuit 430 when the output voltage $VOUT_{LINEARREG}$ 402 of linear regulator 420 is within 10% of the output voltage $VOUT_{CONVERTER}$ 432 of power conversion circuit 430. In other embodiments, the output voltage $VOUT_{LINEARREG}$ 402 of linear regulator 420 may be considered substantially the same as the output voltage $VOUT_{CONVERTER}$ 432 of power conversion circuit 430 when the output voltage $VOUT_{LINEARREG}$ 402 of linear regulator 420 is within 5% of the output voltage $VOUT_{CONVERTER}$ 432 of power conversion circuit 430. In other embodiments, the output voltage $VOUT_{LINEARREG}$ 402 of linear regulator 420 may be considered substantially the same as the output voltage $VOUT_{CONVERTER}$ 432 of power conversion circuit 430 when the output voltage $VOUT_{LINEARREG}$ 402 of linear regulator 420 is within 1% of the output voltage $VOUT_{CONVERTER}$ 432 of power conversion circuit 430. In yet further embodiments, the output voltage $VOUT_{LINEARREG}$ 402 of linear regulator 420 may be considered substantially the same as the output voltage $VOUT_{CONVERTER}$ 432 of power conversion circuit 430 when the output voltage $VOUT_{LINEARREG}$ 402 of linear regulator 420 matches the output voltage $VOUT_{CONVERTER}$ 432 of power conversion circuit 430.

Such an advantageous effect may be achieved by providing a second switching device 470 across the output capacitance 410 of linear regulator 420. A DISCHARGE 486 control signal may be provided to the second switching device 470. In response to the DISCHARGE 486 control signal transitioning from open to closed status, the second switching device 470 may close, thus providing a discharge path for discharge of the output capacitance 410 of linear regulator 420. For example, with reference to FIG. 5, in response to the DISCHARGE 586 control signal transitioning from open to closed status, the second switching device 470 may close, and thereby discharge the output capacitance 410 of linear regulator 420. Thus, the output voltage $VOUT_{LINEARREG}$ 502 may be brought down to a value that is substantially similar to the back-biasing voltage, i.e., $VOUT_{CONVERTER}$ 532 (see FIG. 5, transition from A-A to B-B). With reference to FIG. 4, such discharge of the output capacitance 410 of linear regulator 420 may advantageously reduce or minimize charge transfer between output capacitance 210 of linear regulator 220 and output capacitance 240 of power conversion circuit 230 upon closing of the first switching device 450 by bringing the output voltage $VOUT_{LINEARREG}$ 402 of linear regulator 420 down to a value that is substantially similar to the back-biasing voltage, i.e., the output voltage $VOUT_{CONVERTER}$ 432 of power conversion circuit 430, before then closing the first switching device 450. In some embodiments, the circuit 400 may be configured to reduce or minimize the output voltage $VOUT_{LINEARREG}$ 402 of linear regulator 420 in a substantially linear manner down to the back-biasing voltage, i.e., the output voltage $VOUT_{CONVERTER}$ 432 of power conversion circuit 430, before then closing the first switching device 450.

Figure 5:
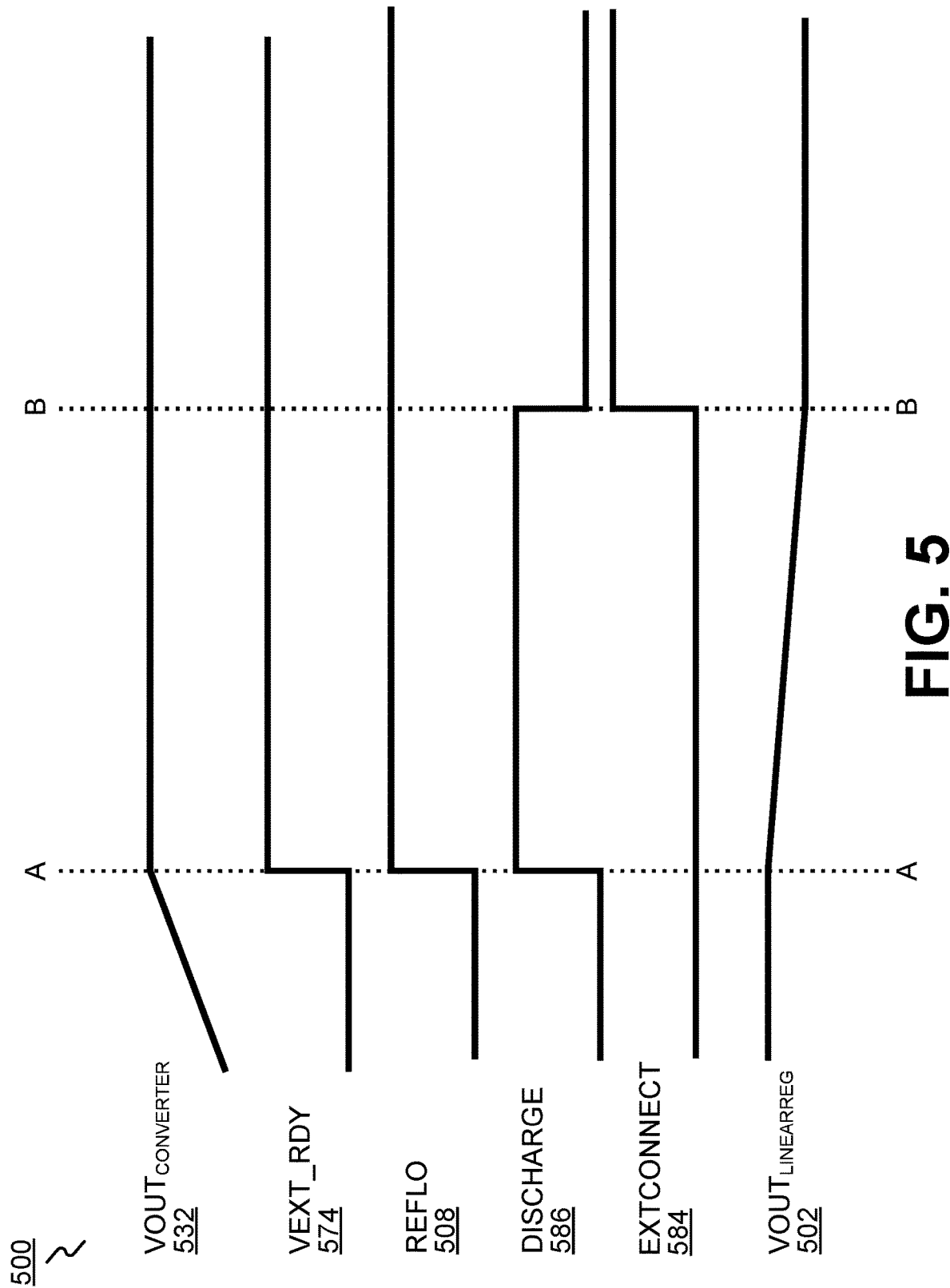
FIG. 5 is an example timing diagram illustrating traces of various signals that may be present in the example linear regulator with back-biasing using a power conversion circuit and associated control circuitry of FIG. 4.

The example circuitry depicted in FIG. 4 can achieve the operation of closing of second switching device 470 to discharge the output capacitance 410 of linear regulator 420 before then closing the first switching device 450 to apply the back-biasing output voltage $VOUT_{CONVERTER}$ 432 of power conversion circuit 430 to the linear regulator 420. For example, circuit 400 may include a comparator 472 which may be configured to compare the output voltage $VOUT_{CONVERTER}$ 432 of power conversion circuit 430 to a reference voltage, $V_{BG}$ 471. When the output voltage $VOUT_{CONVERTER}$ 432 of power conversion circuit 430 exceeds the reference voltage, $V_{BG}$ 471, comparator 472 may provide a VEXT_RDY 474 signal that enables other components of circuit 400. With reference to FIG. 5, when output voltage $VOUT_{CONVERTER}$ 532 exceeds a reference voltage (such as FIG. 4, $V_{BG}$ 471), the VEXT_RDY 574 signal that enables the other components of circuit 400 goes high/enabled (see FIG. 5, transition at A-A). For example, the VEXT_RDY 474 signal may be provided as a REFLO 408 input into linear regulator 420 that enables the linear regulator 420. For example, as shown in FIG. 5, when the VEXT_RDY 574 signal goes high/enabled, the REFLO 508 signal also goes high/enabled. In some embodiments, the REFLO 508 signal may be changed to change the signal of reference voltage input REF 208 that is coupled to two-input buffer 206. For example, reducing the signal of reference voltage input REF 208 may prevent the MOSFET 203 from attempting to increase output voltage 202 of linear regulator 220 based on the difference between feedback voltage $V_{FB}$ 207 and reference voltage input REF 208. The VEXT_RDY 474 signal may also be provided as an input into AND gate 482 and AND gate 483, which may enable each of these logic components to respond to their other input. With reference to FIG. 5, when the VEXT_RDY 574 signal that goes high/enabled (see FIG. 5, transition at A-A) can enable the AND gate 482 and AND gate 483 of circuit 400.

In addition, the inverse of VEXT_RDY 474 signal may also be provided into the reset input R of latch 481. For example, the VEXT_RDY 474 signal may be provided as an input to NOT gate 475, and the output of NOT gate 475 may be provided into the reset input R of latch 481. Accordingly, when the VEXT_RDY 474 signal is enabled, the reset input R of latch 481 may be not enabled (typically '0'), and thus the latch 481 may be enabled to respond to the input provided into the set input S of latch 481.

Further, for example, circuit 400 may include a comparator 473 which may be configured to compare the output voltage $VOUT_{CONVERTER}$ 432 of power conversion circuit 430 to the output voltage $VOUT_{LINEARREG}$ 402 of linear regulator 420. Comparator 473 may be configured to provide its output as an input into a set input S of latch 481.

When the output voltage $VOUT_{LINEARREG}$ 402 of linear regulator 420 exceeds the output voltage $VOUT_{CONVERTER}$ 432 of power conversion circuit 430, the second switching device 470 may be closed to discharge the output capacitance 410 of linear regulator 420 before then closing the first switching device 450 to apply the back-biasing output voltage $VOUT_{CONVERTER}$ 432 of power conversion circuit 430 to the linear regulator 420. For example, when the output voltage $VOUT_{LINEARREG}$ 402 of linear regulator 420 exceeds the output voltage $VOUT_{CONVERTER}$ 432 of power conversion circuit 430, the comparator 473 may provide a low/disable/reset output signal that resets the latch 481. The comparator 473's output may be provided as an input into a set input S of latch 481, which may reset the set input of the latch 481. Further, if the output voltage $VOUT_{CONVERTER}$ 432 of power conversion circuit 430 is less than the reference voltage $V_{BG}$, the reset input into latch 481 may also be enabled due to the NOT gate 475 inverting the disabled VEXT_RDY 474 signal. The output Q of latch 481, which may be provided as a EXT_CONNECT 484 signal, may thus be low/disabled. The EXT_CONNECT 484 signal may be provided as an input into AND gate 482. Thus, because the EXT_CONNECT 484 signal is low/disabled, the output of the AND gate 482 may also be low/disabled, and thus may cause the first switching device 450 to be open.

By contrast, EXT_CONNECT 484 signal may also be provided as an input into NOT gate 485. Because the EXT_CONNECT 484 signal may be low/disabled, the output of the NOT gate 485 may be high/enabled, which may be provided as an input into AND gate 483. Thus, the output of AND gate 483 may be high/enabled. The output of AND gate 483 may be provided as the DISCHARGE 486 signal, which may be provided as an input into the second switching device 470 and may cause the second switching device 470 to be closed. For example, with reference to FIG. 5 (transition at A-A), when the VEXT_RDY 574 signal is high/enabled, and the output voltage $VOUT_{LINEARREG}$ 502 exceeds the output voltage $VOUT_{CONVERTER}$ 532, and the EXT_CONNECT 484 signal is low/disabled, the DISCHARGE 586 signal is high/enabled. With reference to FIG. 4, in this manner, discharge of output capacitance 410 of linear regulator 420 may be achieved through the discharge path completed by closing the switching device 470, until the output voltage $VOUT_{LINEARREG}$ 402 of linear regulator 420 is reduced or minimized to be substantially the same as the output voltage $VOUT_{CONVERTER}$ 432 of power conversion circuit 430. In some embodiments, the circuit 400 may be configured to reduce or minimize the output voltage $VOUT_{LINEARREG}$ 402 of linear regulator 420 in a substantially linear manner, after closing the second switching device 470, down to the back-biasing voltage, i.e., the output voltage $VOUT_{CONVERTER}$ 432 of power conversion circuit 430, before then closing the first switching device 450. During this discharge phase, as explained above, the first switching device 450 would be open and thus the back-biasing voltage, i.e., the output voltage $VOUT_{CONVERTER}$ 432 of power conversion circuit 430 would not be applied to the linear regulator 420. Further, during this discharge phase, the latch 481 may be configured to hold an existing output Q and EXT_CONNECT that is low/disabled, because both the reset R and set S inputs of latch 481 are low/disabled during this discharge phase. Thus, circuit 400 may be configured during this discharge phase to hold existing positions for the first switching device 450 (open) and the second switching device 470 (closed) while the output voltage $VOUT_{CONVERTER}$ 432 of power conversion circuit 430 exceeds the reference voltage $V_{BG}$ 471, and the output voltage $VOUT_{LINEARREG}$ 402 of linear regulator 420 exceeds the output voltage $VOUT_{CONVERTER}$ 432 of power conversion circuit 430.

Once the output voltage $VOUT_{LINEARREG}$ 402 of linear regulator 420 is reduced or minimized to be substantially the same as the output voltage $VOUT_{CONVERTER}$ 432 of power conversion circuit 430, the second switching device 470 may be opened to cease discharge of the output capacitance 410 of linear regulator 420 and the first switching device 450 may be closed to apply the back-biasing output voltage $VOUT_{CONVERTER}$ 432 of power conversion circuit 430 to the linear regulator 420. For example, when the output voltage $VOUT_{LINEARREG}$ 402 of linear regulator 420 is substantially the same as the output voltage $VOUT_{CONVERTER}$ 432 of power conversion circuit 430, the comparator 473 may provide a high/enable/set output signal that sets the latch 481. The comparator 473's output may be provided as an input into a set input S of latch 481, which may set to high/enable the set input of the latch 481. Further, if the output voltage $VOUT_{CONVERTER}$ 432 of power conversion circuit 430 exceeds the reference voltage $V_{BG}$, the reset input into latch 481 may also be disabled due to the NOT gate 475 inverting the enabled VEXT_RDY 474 signal. The output Q of latch 481, which may be provided as a EXT_ CONNECT 484 signal, may thus be high/enabled. The EXT_CONNECT 484 signal may be provided as an input into AND gate 482. Thus, because the EXT_CONNECT 484 signal is high/enabled, the output of the AND gate 482 may also be high/enabled, and thus may cause the first switching device 450 to be closed.

By contrast, EXT_CONNECT 484 signal may also be provided as an input into NOT gate 485. Because the EXT_CONNECT 484 signal may be high/enabled, the output of the NOT gate 485 may be low/disabled, which may be provided as an input into AND gate 483. Thus, the output of AND gate 483 may be low/disabled. The output of AND gate 483 may be provided as the DISCHARGE 486 signal, which may be provided as an input into the second switching device 470 and may cause the second switching device 470 to be open. For example, with reference to FIG. 5 (transition at B-B), when the VEXT_RDY 574 signal is high/enabled, and the output voltage $VOUT_{LINEARREG}$ 502 has been reduced or minimized to be substantially the same the output voltage $VOUT_{CONVERTER}$ 532, and the EXT_CONNECT 484 signal is high/enabled, the DISCHARGE 586 signal is low/disabled. With reference to FIG. 4, in this manner, once the output voltage $VOUT_{LINEARREG}$ 402 of linear regulator 420 is reduced or minimized to be substantially the same as the output voltage $VOUT_{CONVERTER}$ 432 of power conversion circuit 430, discharge of output capacitance 410 of linear regulator 420 may be ceased by opening the previously closed discharge path by opening the second switching device 470. During this phase, as explained above, the first switching device 450 would be closed and thus the back-biasing voltage, i.e., the output voltage $VOUT_{CONVERTER}$ 432 of power conversion circuit 430 would be applied to the linear regulator 420.

In this manner, reduction or minimization can be achieved of undesired instantaneous spike of in-rush current caused by voltage difference between $VOUT_{LINEARREG}$ 402/502 and $VOUT_{CONVERTER}$ 432/532 when the first switching device 450 is closed to apply the output voltage $VOUT_{CONVERTER}$ 432/532 of power conversion circuit 430 as back-biasing voltage to the output of linear regulator 420.

Although the example circuit 400 has been described above as using AND gates 482 and 483, NOT gates 475 and 485, and a latch 481, it is to be understood that the overall operation of circuit 400 may be achieved by way of any suitable implementation of logical components, such as NAND or XOR logic. Moreover, the functionality described above with respect to circuit 400 may be achieved through use of any other types of components aside from the described AND gates 482 and 483, NOT gates 475 and 485, and latch 481. The use of such components is to be considered merely exemplary and not restrictive of the invention, as claimed.

The embodiments may further be described using the following clauses:

1. A power converter system, comprising:
   a power conversion circuit;
   a linear regulator;
   a first switching device electrically coupled between an output of the power conversion circuit and an output of the linear regulator; and
   a control circuitry electrically coupled to the first switching device;
   wherein, after a voltage at the output of the power conversion circuit exceeds a reference voltage, the control circuitry is configured to discharge an output capacitance of the linear regulator until a voltage at the output of the linear regulator is substantially the same as the voltage at the output of the power conversion circuit.

2. The system of clause 1, further comprising:
   a second switching device electrically coupled across an output capacitance of the linear regulator;

wherein the control circuitry is electrically coupled to the second switching device.

3. The system of clause 1, wherein the control circuitry is configured to close the first switching device after a voltage at the output of the linear regulator matches the voltage at the output of the power conversion circuit.

4. The system of clause 2, wherein the control circuitry is configured to close the second switching device at a time when a voltage at the output of the linear regulator exceeds the voltage at the output of the power conversion circuit.

5. The system of clause 4, the control circuitry further comprising a latch that is configured to open the first switching device and close the second switching device if the voltage at the output of the power conversion circuit exceeds the reference voltage, and the voltage at the output of the linear regulator exceeds the voltage at the output of the power conversion circuit.

6. The system of clause 5, wherein the latch is further configured to hold existing positions for the first switching device and the second switching device while the voltage at the output of the power conversion circuit exceeds the reference voltage, and the voltage at the output of the linear regulator exceeds the voltage at the output of the power conversion circuit.

7. The system of clause 5, wherein the latch is further configured to close the first switching device after the voltage at the output of the power conversion circuit exceeds the voltage at the output of the linear regulator.

8. The system of clause 1, where the power conversion circuit is a step-down converter.

9. The system of clause 8, wherein the step-down converter is a charge pump.

10. The system of clause 1, wherein the linear regulator is a low drop-out regulator.

11. The system of clause 10, wherein the control circuitry is configured to turn on or off the low drop-out regulator.

12. The system of clause 2, wherein the control circuitry is configured to reduce a voltage at the output of the linear regulator in a substantially linear manner after the control circuitry closes the second switching device.

13. The system of clause 1, wherein the voltage at the output of the linear regulator is substantially the same as the voltage at the output of the power conversion circuit when the voltage at the output of the linear regulator is within 10% of the voltage at the output of the power conversion circuit.

14. The system of clause 13, wherein the voltage at the output of the linear regulator is substantially the same as the voltage at the output of the power conversion circuit when the voltage at the output of the linear regulator is within 5% of the voltage at the output of the power conversion circuit.

15. The system of clause 14, wherein the voltage at the output of the linear regulator is substantially the same as the voltage at the output of the power conversion circuit when the voltage at the output of the linear regulator is within 1% of the voltage at the output of the power conversion circuit.

16. A power conversion method, comprising:
comparing, via a control circuitry, a voltage at an output of a power conversion circuit to a reference voltage;
wherein a first switching device is electrically coupled between the output of the power conversion circuit and an output of a linear regulator;
wherein the control circuitry is electrically coupled to the first switching device; and
discharging an output capacitance of the linear regular after the voltage at the output of the power conversion circuit exceeds the reference voltage, until a voltage at the output of the linear regulator is substantially the same as the voltage at the output of the power conversion circuit.

17. The method of clause 16, wherein a second switching device is electrically coupled across an output capacitance of the linear regulator, the control circuitry electrically coupled to the second switching device.

18. The method of clause 16, further comprising:
closing, via the control circuitry, the first switching device after a voltage at the output of the linear regulator matches the voltage at the output of the power conversion circuit.

19. The method of clause 17, further comprising:
closing, via the control circuitry, the second switching device;
wherein, when the second switching device is closed via the control circuitry, a voltage at the output of the linear regulator exceeds the voltage at the output of the power conversion circuit.

20. The method of clause 19, further comprising:
providing, via a latch included in the control circuitry, a signal to open the first switching device and close the second switching device if the voltage at the output of the power conversion circuit exceeds the reference voltage, and the voltage at the output of the linear regulator exceeds the voltage at the output of the power conversion circuit.

21. The method of clause 20, further comprising:
holding, via the latch included in the control circuitry, existing positions for the first switching device and the second switching device while the voltage at the output of the power conversion circuit exceeds the reference voltage, and the voltage at the output of the linear regulator exceeds the voltage at the output of the power conversion circuit.

22. The method of clause 20, further comprising:
closing, via the latch included in the control circuitry, the first switching device after the voltage at the output of the power conversion circuit exceeds the voltage at the output of the linear regulator.

23. The method of clause 16, wherein the power conversion circuit is a step-down converter.

24. The method of clause 23, wherein the step-down converter is a charge pump.

25. The method of clause 16, wherein the linear regulator is a low drop-out regulator.

26. The method of clause 25, wherein the control circuitry is configured to turn on or off the low drop-out regulator.

27. The method of clause 17, further comprising:
reducing, via the control circuitry, a voltage at the output of the linear regulator in a substantially linear manner after the control circuitry closes the second switching device.

28. The method of clause 16, wherein the voltage at the output of the linear regulator is substantially the same as the voltage at the output of the power conversion circuit when the voltage at the output of the linear regulator is within 10% of the voltage at the output of the power conversion circuit.

29. The method of clause 28, wherein the voltage at the output of the linear regulator is substantially the same as the voltage at the output of the power conversion circuit when the voltage at the output of the linear regulator is within 5% of the voltage at the output of the power conversion circuit.

30. The method of clause 29, wherein the voltage at the output of the linear regulator is substantially the same as the voltage at the output of the power conversion circuit when the voltage at the output of the linear regulator is within 1% of the voltage at the output of the power conversion circuit.

31. An integrated circuit, comprising:
a first switching device; and
a control circuitry electrically coupled to the first switching device;
wherein the first switching device is configured to be electrically coupled between an output of a power conversion circuit and an output of a linear regulator;
wherein, after a voltage at the output of the power conversion circuit exceeds a reference voltage, the control circuitry is configured to discharge an output capacitance of the linear regulator until a voltage at the output of the linear regulator is substantially the same as the voltage at the output of the power conversion circuit.

32. The system of clause 31, further comprising:
a second switching device, wherein the second switching device is configured to be electrically coupled across an output capacitance of the linear regulator;
wherein the control circuitry is electrically coupled to the second switching device.

33. The integrated circuit of clause 31, further comprising the power conversion circuit.

34. The integrated circuit of clause 33, wherein the power conversion circuit is a step-down converter.

35. The integrated circuit of clause 34, wherein the step-down converter is a charge pump.

36. The integrated circuit of clause 31, further comprising the linear regulator.

37. The integrated circuit of clause 35, further comprising the linear regulator.

38. The integrated circuit of clause 36, wherein the linear regulator is a low drop-out regulator.

39. The integrated circuit of clause 38, wherein the control circuitry is configured to turn on or off the low drop-out regulator.

40. The integrated circuit of clause 37, wherein the linear regulator is a low drop-out regulator.

41. The integrated circuit of clause 40, wherein the control circuitry is configured to turn on or off the low drop-out regulator.

42. The integrated circuit of clause 31, wherein the control circuitry is configured to close the first switching device after a voltage at the output of the linear regulator matches the voltage at the output of the power conversion circuit.

43. The integrated circuit of clause 32, wherein the control circuitry is configured to close the second switching device at a time when a voltage at the output of the linear regulator exceeds the voltage at the output of the power conversion circuit.

44. The integrated circuit of clause 43, the control circuitry further comprising a latch that is configured to open the first switching device and close the second switching device if the voltage at the output of the power conversion circuit exceeds the reference voltage, and the voltage at the output of the linear regulator exceeds the voltage at the output of the power conversion circuit.

45. The integrated circuit of clause 44, wherein the latch is further configured to hold existing positions for the first switching device and the second switching device while the voltage at the output of the power conversion circuit exceeds the reference voltage, and the voltage at the output of the linear regulator exceeds the voltage at the output of the power conversion circuit.

46. The integrated circuit of clause 44, wherein the latch is further configured to close the first switching device after the voltage at the output of the power conversion circuit exceeds the voltage at the output of the linear regulator.

47. The integrated circuit of clause 32, wherein the control circuitry is configured to reduce a voltage at the output of the linear regulator in a substantially linear manner after the control circuitry closes the second switching device.

48. The integrated circuit of clause 31, wherein the voltage at the output of the linear regulator is substantially the same as the voltage at the output of the power conversion circuit when the voltage at the output of the linear regulator is within 10% of the voltage at the output of the power conversion circuit.

49. The integrated circuit of clause 48, wherein the voltage at the output of the linear regulator is substantially the same as the voltage at the output of the power conversion circuit when the voltage at the output of the linear regulator is within 5% of the voltage at the output of the power conversion circuit.

50. The integrated circuit of clause 49, wherein the voltage at the output of the linear regulator is substantially the same as the voltage at the output of the power conversion circuit when the voltage at the output of the linear regulator is within 1% of the voltage at the output of the power conversion circuit.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

Although the terms "first," "second," etc., may be used herein to describe various elements, these elements should not be limited by these terms.

These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

Spatially relative terms, such as "beneath," "below," "lower," "bottom," "above," "upper", "top," "toward," and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In this disclosure, the term "coupled" may also be termed as "electrically coupled", and the term "connected" may be termed as "electrically connected". "Coupled" and "connected" may also be used to indicate that two or more elements cooperate or interact with each other.

In this disclosure, the term "node" may refer to a location within an electrical circuit or system. A node may include, for example, a terminal (e.g., the terminal of a component, such as the drain terminal of a transistor), a location or region along a trace or wire, or the point at which two components are electrically coupled. While a particular location of a node may be described, to the extent that other locations have equivalent electrical properties, such locations may be used. For example, all locations along a trace that are not separated by a resistor may have the same voltage and may be considered the same node for purposes of determining voltage at that location. Similarly, in this disclosure, a terminal may be used to refer to a location in a circuit that may not necessarily include a physical connection point. Terminal may, for example, refer to a node within a circuit.

Throughout this disclosure, embodiments are discussed in relation to particular electrical components, such as capacitors and inductors. Although an individual component may be discussed (e.g., a single capacitor, a single inductor), a combination of multiple components may be substituted for the single component. For example, while a single capacitor may be discussed or depicted, two or more capacitors (e.g., in series, parallel, or a combination of the two) may be substituted so long as the required qualities remain the same. In this example, an embodiment that calls for a single 20 mF capacitor may use two capacitors of 10 mF in parallel instead. Similar substitutions may be made for inductors.

The concepts in the disclosure may be applied to various types of regulators and/or power converters. Power converters which convert a higher input voltage power source to a lower output voltage level are commonly known as step-down or buck converters, because the converter is "bucking" the input voltage. Power converters which convert a lower input voltage power source to a higher output voltage level are commonly known as step-up or boost converters, because the converter is "boosting" the input voltage. In addition, some power converters, commonly known as "buck-boost converters," may be configured to convert the input voltage power source to the output voltage with a wide range, in which the output voltage may be either higher than or lower than the input voltage. In various embodiments, a power converter may be bidirectional, being either a step-up or a step-down converter depending on how a power source is connected to the converter. In some embodiments, an AC-DC power converter can be built up from a DC-DC power converter by, for example, first rectifying an AC input voltage to a DC voltage and then applying the DC voltage to a DC-DC power converter.

Voltage ratings of electrical components, such as capacitors, inductors, and/or transistors, within the power converter may be selected according to actual needs. However, transient over-voltages may occur in the electric system due to the switching off of loads and due to short accelerator tip-ins, which may cause the electrical components to experience temporary over-voltage stress that results in damages to the power electronic devices. In some embodiments, a Metal-Oxide-Semiconductor Field-Effect Transistor (MOSFET) can be used as both the protection switch for preventing undesired power flow, and the voltage standoff device for withstanding a large voltage during the transient over-voltage condition and maintain normal operation of the power converter without triggering an isolation protection.

Disclosed embodiments may include one or more controllers to control, for example, the startup and operation of disclosed embodiments. Controller(s) and control mechanisms may be implemented in various methods including analog control, digital control, and mixed analog and digital control. These control mechanisms can be implemented or integrated within the embodiments themselves or implemented as a microprocessor, a microcontroller, a digital signal processor (DSP), register-transfer level (RTL) circuitry, and/or combinatorial logic.

Disclosed embodiments may include one or more MOSFETs. In embodiments, a MOSFET may refer to any field effect transistor (FET) having an insulated gate whose voltage determines the conductivity of the transistor. In some embodiments, MOSFETS may encompass insulated gates having a metal or metal-like, insulator, and/or semiconductor structure. The metal or metal-like structures may include at least one electrically conductive material (e.g., such as aluminum, copper, other metal, highly doped polysilicon, graphene, or other electrical conductor). The insulator structures may include at least one insulating material (e.g., such as silicon oxide or other dielectric material). The semiconductor structures may include at least one semiconductor material.

Circuits and devices in accordance with the present disclosure may be used alone or in combination with other components, circuits, and devices. Embodiments may be fabricated as integrated circuits (ICs), which may be encased in IC packages and/or in modules for ease of handling, manufacture, and/or improved performance. For example, IC embodiments of the present disclosure may be used in modules in which one or more of such ICs are combined with other circuit components or blocks (e.g., filters, amplifiers, passive components, and possibly additional ICs) into one package. The ICs and/or modules may be then combined with other components, such as on a printed circuit board, to form part of an end product such as a cellular telephone, laptop computer, or electronic tablet, or to form a higher-level module which may be used in a wide variety of products, such as vehicles, test equipment, computing devices, industrial devices, medical devices, etc.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the disclosure disclosed herein. It is also intended that the sequence of steps shown in figures are only for illustrative purposes and are not intended to be limited to any particular sequence of steps. As such, those skilled in the art can appreciate that these steps can be performed in a different order while implementing the same method.

It is appreciated that certain features of the specification, which are, for clarity, described in the context of separate embodiments, may also be provided in combination in a single embodiment. Conversely, various features of the specification, which are, for brevity, described in the context of a single embodiment, may also be provided separately or in any suitable sub-combination or as suitable in any other described embodiments of the specification. Certain features described in the context of various embodiments are not to be considered essential features of those embodiments unless the embodiment is inoperative without those elements.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A power converter system, comprising:
a power conversion circuit;
a linear regulator;
a first switching device electrically coupled between an output of the power conversion circuit and an output of the linear regulator;
a control circuitry electrically coupled to the first switching device; and
a second switching device electrically coupled across an output capacitance of the linear regulator;
wherein:
the control circuitry is electrically coupled to the second switching device;
after a voltage at the output of the power conversion circuit exceeds a reference voltage, the control circuitry is configured to discharge the output capacitance of the linear regulator until a voltage at the output of the linear regulator is substantially the same as the voltage at the output of the power conversion circuit; and
the control circuitry is configured to close the second switching device at a time when a voltage at the output of the linear regulator exceeds the voltage at the output of the power conversion circuit.

2. The system of claim 1, wherein the control circuitry is configured to close the first switching device after a voltage at the output of the linear regulator matches the voltage at the output of the power conversion circuit.

3. The system of claim 1, the control circuitry further comprising a latch that is configured to open the first switching device and close the second switching device if the voltage at the output of the power conversion circuit exceeds the reference voltage, and the voltage at the output of the linear regulator exceeds the voltage at the output of the power conversion circuit.

4. The system of claim 3, wherein the latch is further configured to hold existing positions for the first switching device and the second switching device while the voltage at the output of the power conversion circuit exceeds the reference voltage, and the voltage at the output of the linear regulator exceeds the voltage at the output of the power conversion circuit.

5. The system of claim 3, wherein the latch is further configured to close the first switching device after the voltage at the output of the power conversion circuit exceeds the voltage at the output of the linear regulator.

6. The system of claim 1, where the power conversion circuit is a step-down converter.

7. The system of claim 6, wherein the step-down converter is a charge pump.

8. The system of claim 1, wherein the linear regulator is a low drop-out regulator.

9. The system of claim 8, wherein the control circuitry is configured to turn on or off the low drop-out regulator.

10. The system of claim 1, wherein the control circuitry is configured to reduce a voltage at the output of the linear regulator in a substantially linear manner after the control circuitry closes the second switching device.

11. The system of claim 1, wherein the voltage at the output of the linear regulator is substantially the same as the voltage at the output of the power conversion circuit when the voltage at the output of the linear regulator is within 10% of the voltage at the output of the power conversion circuit.

12. The system of claim 11, wherein the voltage at the output of the linear regulator is substantially the same as the voltage at the output of the power conversion circuit when the voltage at the output of the linear regulator is within 5% of the voltage at the output of the power conversion circuit.

13. The system of claim 12, wherein the voltage at the output of the linear regulator is substantially the same as the voltage at the output of the power conversion circuit when the voltage at the output of the linear regulator is within 1% of the voltage at the output of the power conversion circuit.

14. A power conversion method, comprising:
comparing, via a control circuitry, a voltage at an output of a power conversion circuit to a reference voltage;
wherein a first switching device is electrically coupled between the output of the power conversion circuit and an output of a linear regulator;
wherein the control circuitry is electrically coupled to the first switching device;
discharging an output capacitance of the linear regulator after the voltage at the output of the power conversion circuit exceeds the reference voltage, until a voltage at the output of the linear regulator is substantially the same as the voltage at the output of the power conversion circuit;
wherein a second switching device is electrically coupled across the output capacitance of the linear regulator, the control circuitry electrically coupled to the second switching device; and
closing, via the control circuitry, the second switching device;
wherein, when the second switching device is closed via the control circuitry, a voltage at the output of the linear regulator exceeds the voltage at the output of the power conversion circuit.

15. The method of claim 14, further comprising:
closing, via the control circuitry, the first switching device after a voltage at the output of the linear regulator matches the voltage at the output of the power conversion circuit.

16. The method of claim 14, further comprising:
providing, via a latch included in the control circuitry, a signal to open the first switching device and close the second switching device if the voltage at the output of the power conversion circuit exceeds the reference voltage, and the voltage at the output of the linear regulator exceeds the voltage at the output of the power conversion circuit.

17. The method of claim 16, further comprising:
holding, via the latch included in the control circuitry, existing positions for the first switching device and the second switching device while the voltage at the output of the power conversion circuit exceeds the reference voltage, and the voltage at the output of the linear regulator exceeds the voltage at the output of the power conversion circuit.

18. The method of claim 16, further comprising:
closing, via the latch included in the control circuitry, the first switching device after the voltage at the output of the power conversion circuit exceeds the voltage at the output of the linear regulator.

19. The method of claim 14, wherein the power conversion circuit is a step-down converter.

20. The method of claim 19, wherein the step-down converter is a charge pump.

21. The method of claim 14, wherein the linear regulator is a low drop-out regulator.

22. The method of claim 21, wherein the control circuitry is configured to turn on or off the low drop-out regulator.

23. The method of claim 14, further comprising:
   reducing, via the control circuitry, a voltage at the output of the linear regulator in a substantially linear manner after the control circuitry closes the second switching device.

24. The method of claim 14, wherein the voltage at the output of the linear regulator is substantially the same as the voltage at the output of the power conversion circuit when the voltage at the output of the linear regulator is within 10% of the voltage at the output of the power conversion circuit.

25. The method of claim 24, wherein the voltage at the output of the linear regulator is substantially the same as the voltage at the output of the power conversion circuit when the voltage at the output of the linear regulator is within 5% of the voltage at the output of the power conversion circuit.

26. The method of claim 25, wherein the voltage at the output of the linear regulator is substantially the same as the voltage at the output of the power conversion circuit when the voltage at the output of the linear regulator is within 1% of the voltage at the output of the power conversion circuit.

* * * * *

UNITED STATES PATENT AND TRADEMARK OFFICE
CERTIFICATE OF CORRECTION

PATENT NO. : 12,381,471 B2
APPLICATION NO. : 17/938396
DATED : August 5, 2025
INVENTOR(S) : Jeffrey Ju Page 1 of 1

It is certified that error appears in the above-identified patent and that said Letters Patent is hereby corrected as shown below:

In the Specification

In the DETAILED DESCRIPTION:

Column 4, Line 35, change "voltage VFs 207" to --voltage $V_{FB}$ 207--.

Signed and Sealed this
Seventh Day of October, 2025

John A. Squires
*Director of the United States Patent and Trademark Office*